United States Patent
Premuzic et al.

(10) Patent No.: US 6,537,796 B1
(45) Date of Patent: Mar. 25, 2003

(54) CONVERSION OF GEOTHERMAL WASTE TO COMMERCIAL PRODUCTS INCLUDING SILICA

(75) Inventors: Eugene T. Premuzic, East Moriches, NY (US); Mow S. Lin, Rocky Point, NY (US)

(73) Assignee: Brookhaven Science Associates, LLC, Upton, NY (US)

(*) Notice: Subject to any disclaimer, the term of this patent is extended or adjusted under 35 U.S.C. 154(b) by 0 days.

(21) Appl. No.: 09/312,212

(22) Filed: May 14, 1999

(51) Int. Cl.[7] .......................... C01B 33/18; C02F 1/52
(52) U.S. Cl. ................ 435/262; 435/262.5; 423/27; 423/28; 423/335; 423/340; 423/DIG. 17
(58) Field of Search ................... 435/262, 262.5; 423/335, 340, 1, 27, 28, DIG. 17

(56) References Cited

U.S. PATENT DOCUMENTS

| | | | | |
|---|---|---|---|---|
| 4,042,671 A | * | 8/1977 | Bowdish | 423/340 |
| 4,294,811 A | * | 10/1981 | Aulich et al. | 423/350 |
| 4,437,995 A | | 3/1984 | Rex | 210/714 |
| 4,780,238 A | | 10/1988 | Premuzic | 252/184 |
| 5,024,769 A | | 6/1991 | Gallup | 210/721 |
| 5,061,373 A | | 10/1991 | Gallup | 210/697 |
| 5,098,578 A | | 3/1992 | Gallup | 210/696 |
| 5,200,165 A | | 4/1993 | Harper et al. | 423/339 |
| 5,305,607 A | | 4/1994 | Bonham, Jr. | 60/641.5 |
| 5,339,621 A | | 8/1994 | Tolman | 60/39.02 |
| 5,364,439 A | | 11/1994 | Gallup et al. | 71/57 |
| 5,366,891 A | | 11/1994 | Premuzic et al. | 435/262 |
| 5,492,828 A | | 2/1996 | Premuzic et al. | 435/245 |
| 5,551,976 A | | 9/1996 | Allen | 106/696 |
| 5,595,717 A | | 1/1997 | Harper et al. | 423/339 |

OTHER PUBLICATIONS

Royce. B.A., "An Analysis of Environmental Regulations Governing The Disposal of Geothermal Wastes in California," *BNL 37577 Informal Report*, 1–46(Sep. 1985).

Premuzic E.T., Mow, S.L. and Lian H., "Biochemical Processing of Geothermal Brines and Sludges," *Biosystems and Process Sciences Division, Dept. of Applied Science*, (Mar. 1995).

(List continued on next page.)

*Primary Examiner*—David A. Redding
(74) *Attorney, Agent, or Firm*—Margaret C. Bogosian

(57) ABSTRACT

A process for the treatment of geothermal residue includes contacting the pigmented amorphous silica-containing component with a depigmenting reagent one or more times to depigment the silica and produce a mixture containing depigmented amorphous silica and depigmenting reagent containing pigment material; separating the depigmented amorphous silica and from the depigmenting reagent to yield depigmented amorphous silica. Before or after the depigmenting contacting, the geothermal residue or depigmented silica can be treated with a metal solubilizing agent to produce another mixture containing pigmented or unpigmented amorphous silica-containing component and a solubilized metal-containing component; separating these components from each other to produce an amorphous silica product substantially devoid of metals and at least partially devoid of pigment. The amorphous silica product can be neutralized and thereafter dried at a temperature from about 25° C. to 300° C. The morphology of the silica product can be varied through the process conditions including sequence contacting steps, pH of depigmenting reagent, neutralization and drying conditions to tailor the amorphous silica for commercial use in products including filler for paint, paper, rubber and polymers, and chromatographic material.

13 Claims, 14 Drawing Sheets

Experimental Setup for Treatment of High-Saline Brine Sludges

OTHER PUBLICATIONS

Premuzic, E.T., Mow, S.L. and Jin, J.Z., "Biochemical Processing of Geothermal Brines and Sludges: Adaptability to Multiple Industrial Applications," *Biosystems and Process Sciences Division, Department of Applied Sciences*, 18:127–131 (Oct. 1994).

Premuzic, E.T., Lin, M.S. and Jin, J.Z., "Recent Developments in Geothermal Waste Treatment Biotechnology," *Heavy Metals in the Environment*, 1:356–363(Sep. 1993).

Premuzic, E.T., Lin, M.S., Jin, J.Z. and Hamilton, K., "Geothermal Waste Treatment Biotechnology," *Biosystems and Process Sciences Division, Brookhaven National Laboratory* (May 1995).

Premuzic, E.T., Lin, M., Francis, A.J. and Schubert, J. "Production of Chelating Agents by *Pseudomonas Aeruginosa* Grown in the Presence of Thorium and Uranium," *Speciation of Fission and Activation Products in the Environment*, 391–397(1985).

Premuzic, E.T., Lin, M.S. and Lian, L.H., "Recent Advances in Biochemical Technology for the Processing of Geothermal Byproducts," *Biosystems and Process Sciences Division, Department of Applied Sciences* (Apr. 1996).

Premuzic, E.T., Lin, M.S., Lian, H. and Miltenberger, R.P., "Geothermal Brines and Sludges: A New Resource," *Dept. of Applied Science, Brookhaven National Lab., Safety and Environmental Protection Division* (Oct. 1996).

Premuzic, E.T., Lin, M.S., Lian, H. and Miltenberger, R.P., "Geothermal Brines and Sludges: A New Resources," *Safety and Environmental Division, Brookhaven National Lab.*, (Jun. 1995).

Premuzic, E.T., Lin, M.S. and Lian, H., "Biochemical Technology For The Detoxification of Geothermal Brines and The Recovery of Trace Metals," *Biosystems and Process Sciences Division, Brookhaven National Laboratory*, 321–324(Sep. 1995).

Premuzic, E.T., Lin, M.S. Jin, J.Z. and Hamilton, K., "Geothermal Waste Treatment Biotechnology," *Energy Sources*, 19:9–17(1997).

Premuzic, E.T., Lin, M.S., Jin, J.Z. and Hamilton, K., "Geothermal Waste Treatment Biotechnology," (May 1995).

Prezumic, E.T., Lin, M.S. and Bohenek, "Advanced Biochemical Processes For Geothermal Brines Current Developments," *Biosystems and Process Sciences Division, Department of Applied Sciences*, (Mar. 1997).

Premuzic, E.T., Lin, M.S. and Lin, J.Z., "Recent Developments in Geothermal Waste Treatment Biotechology," *Heavy Metals in the Environment*, 356–363(Sep. 1993).

Cox, C.D., Rinehart, K.L., Moore, M.L. and Cook, J.C., "Pyochelin: Novel Structure of an Iron–Chelating Growth Promoter for Pseudomonas Aeruginosa," *Proc. Natl. Acad. Sci. USA*, 78:4256–4260(Jul. 1981).

* cited by examiner

Experimental Setup for Treatment of High-Saline Brine Sludges

Biochemical Processing of Geothermal Sludges and Brines: Generation of New Products The Production of Silica from 1364 kg/hr of Geothermal Sludge Using a Single Biocatalyst Biocat and Acid Treated Temperature Effects

CONVERSION OF GEOTHERMAL WASTE TO COMMERCIAL PRODUCTS INCLUDING SILICA

This invention was made with Government support under Contract No. DE-AC02-98CH10886, between the U.S. Department of Energy and Brookhaven Science Association. The Government has certain rights in the invention.

The invention relates to a process for treatment of geothermal residue to produce commercially useful products such as silica from the geothermal waste and to reduce the amount of regulated and non-regulated waste resulting from geothermal power production.

BACKGROUND OF THE INVENTION

Geothermal energy is a major clean energy resource. However, large scale production of energy using geothermal sources produces considerable amounts of waste in the from of residual brine and sludge. The sludge contains solids which precipitate out during the power generation process and the sludge can be highly concentrated in a variety of metal salts, many of them toxic. The sludge also contains a large proportion of silica. High disposal costs and the long-term liability associated with hazardous waste disposal are a continuing problem in the production of geothermal energy. Even if the toxic metals are removed, the sludge still requires expensive disposal. The United States Congress has enacted legislation to oversee the disposal of solid and hazardous wastes (Resource Conservation and Recovery Act (RCRA), 42 U.S.C. Sections 6921 et seq.) A major objective of the RCRA was to provide assistance to state and local governments for the management of hazardous waste. The State of California has an even more stringent hazardous waste control law. Regulations were established for the handling, processing, use, storage, and disposal of hazardous wastes.

Examples of important geothermal sites are located in California, including the Geysers in Sonoma and Lake Counties north of San Francisco and the Imperial Valley of Southern California and geothermal waste is carefully regulated by the state. Geothermal waste determined to be hazardous must be disposed of at a Class I or Class II site. Discharges of nonhazardous waste will generally be at Class III sites. Disposal of regulated waste in all the classes, particularly in Classes I and II, is quite expensive. It would therefore be advantageous to convert geothermal waste to nonhazardous and even useful products.

Geothermal fluids can include steam and hot saline solutions ranging upward to concentrated brines. These fluids can contain exceptional concentrations of dissolved solids including NaCl, KCl, silica, and metals, also hydrogen sulfide. Concentrated brines can also contain appreciable levels of heavy metals, metal salts and oxides of metals such as iron, manganese, lead, zinc, cadmium, molybdenum, thallium, chromium, titanium, antimony, nickel, bismuth, tin, arsenic, antimony and mercury and radionuclides such as radium. Silver and gold may also be present. Wastewaters or condensates from geothermal plants are often reinjected through disposal wells. However, silica and carbonate depositions can cause blockages in rock fissures necessitating chemical processing of brines before reinjection to remove these materials. Solid waste materials from geothermal plants present even more difficult problems.

The technology used to convert geothermal resources to electricity include vapor-dominated (steam) systems and liquid-dominated (hot water) systems. Vapor-dominated systems are easier to exploit for the generation of electricity because steam can be directly expanded in a low pressure turbine. However, liquid-dominated systems are more readily available. The brine from a liquid-dominated system is usually flashed, i.e., abruptly reduced in pressure, to produce steam which is then used to drive a turbine. On cooling of hot geothermal fluids, a sludge is produced which is considered a mixed waste and therefore subject to regulatory constraints. Mixed waste containing heavy metals or radionuclides requires expensive disposal in a hazardous waste site. Processing of low salinity liquids also produces a chemical residue the disposal of which is regulated. The former is associated with Salton Sea type brines and the latter is associated with the Geyser type steam condensates. Brines from the Salton Sea geothermal area in California may contain total dissolved solids up to 350,000 ppm. In other areas such as the Geysers, the major contaminants are more likely arsenic and mercury.

Geothermal power plants generate waste during well drilling and plant operation. Well drilling waste includes drilling muds, brines and residue. Operational waste includes steam condensate and sludge from condensate cooling towers and hydrogen sulfide abatement systems. The sludge is dewatered resulting in a filter cake. All of this results in large volume of both non-regulated waste and hazardous waste which requires safe disposal.

U.S. Pat. No. 5,305,607 describes a method and apparatus for separating silica from scale in a geothermal power plant using silica seed particles and mechanical means based on viscosity. Before the silica separation, metallic sulfides and other hazardous materials are first precipitated in flash crystallizers. The silica filter cake is intended for simple sanitary refuse disposal.

U.S. Pat. No. 5,098,578 describes a method for precipitating a metal from spent geothermal brine by admixing the geothermal brine with steam condensate. The method stabilizes the scale-forming constituents, identified as compounds of silica and calcium, and these are disposed of in an injection well.

U.S. Pat. No. 4,437,995 describes a method for treating geothermal brines to control the precipitation of silica. A sulfate-rich liquid is introduced into residual geothermal brine to react with barium, calcium and/or lead salts to produce a colloidal suspension which accelerates the precipitation of silica from the brine. The product is a silica plus heavy metal sulfate-rich sludge. Although the cleansed brine can be pumped into an injection well, the sludge would require toxic waste disposal.

Inventors herein have suggested the desirability of treating geothermal byproducts to produce commercially acceptable silica products, e.g., Premuzic et al., "Recent Advances in Biochemical Technology for the Processing of Geothermal Byproducts", BNL 62901, April 1996; Premuzic et al., Geothermal Brines and Sludges: A New Resource", BNL 61972, June 1995. However, the recovery of commercially valuable products is only generally mentioned in these publications without any details or specifics of how the recovery might be accomplished.

It is an object of this invention to convert geothermal wastes into non-toxic disposable materials. It is a further object of this invention to convert geothermal wastes into commercially useful products.

SUMMARY OF THE INVENTION

Commercially useful amorphous silica can be obtained by at least once contacting geothermal residue with a depigmenting reagent under depigmenting conditions to produce a mixture comprising depigmented amorphous silica-containing solids and pigment-containing depigmenting reagent liquid. The solids and liquid can be separated from each other to yield amorphous silica product. Before or after the contacting, the geothermal residue or the depigmented amorphous silica-containing solids can be subjected to treatment with a metal salts solubilizing agent to detoxify the geothermal residue by removing metals. The silica product can be neutralized and then dried at a temperature from about 25° C. to about 300° C. The geothermal residue most advantageously processed is a geothermal waste generated after heat extraction in the plant which contains silica and metal salts.

In one embodiment, geothermal residue is first treated with a metal salts solubilizing agent, the contacting producing a first product which includes a) pigmented amorphous silica-containing components and b) solubilized metal-containing components. The metals which are preferably solubilized and removed are toxic metals which require hazardous waste deposition such as heavy metals and radionuclides. For example, in the State of California, regulated toxic metals include antimony, arsenic, barium, beryllium, cadmium, chromium, cobalt, copper, lead, mercury, molybdenum, nickel, selenium, silver, thallium, vanadium and zinc.

Components a) and b) are separated from each other. Component a) is generally solid and component b) is generally liquid. Therefore separation methods can be methods suitable for separating solids from liquids such as filtration, centrifugation, or sedimentation. The separation yields component a) which is predominantly pigmented amorphous silica which is then contacted with depigmenting reagent to produce a second product which includes a mixture of c) substantially depigmented amorphous silica and d) depigmenting reagent containing pigment material. The amorphous silica of c) is substantially solid while d) is substantially liquid. The c) solids and d) liquids can be: separated from each other using separation means to yield metal-detoxified, depigmented silica.

The pigments removed according to the invention include iron compounds. Other colored salts of metals may also be present, e.g., manganese, gold, silver, etc. in ppm amounts. They may contribute to the fine structural characteristics of silica.

Depending on the potential application of the product silica, an alternative to the above embodiment is also applicable. In this alternative, geothermal residue in the form of pigmented sludge is contacted directly with a depigmenting reagent without a preliminary metals solubilizing treatment. The depigmented amorphous silica produced in this alternative method generally has larger particle size and has an increased tendency to agglomerate. A comparison of 1) silica produced using a primary biochemical treatment to remove metals followed by chemical treatment to remove pigment and 2) silica produced using chemical treatment without primary biochemical treatment is shown in FIGS. 8 and 7, respectively.

The morphology, including the pore diameter, pore volume and pore area of the amorphous silica produced according to the invention, can vary with the different embodiments of the invention. In addition, depigmentation treatment alone can be used or it can be combined with biotreatment. Moreover, sequential depigmentation treatments can be used, e.g., one or more acid contacting steps at differing acid concentrations (pH). Acid contacting can be followed by neutralization with a base. A minimal acid neutralization step can be used, or the neutralization can be more severe involving dissolution in base followed by reprecipitation. The morphology of the product can also be varied through the drying temperature of the product, ranging from about 25° C. to about 300° C. for over time periods of up to 24 hours. According to the treatment steps used, the morphology of the product can be refined and the pore size and volume/diameter ratio can be adjusted for use in more demanding applications, e.g., chromatographic materials. The amorphous silica product can be substantially completely depigmented or can be partially depigmented. Partially depigmented silica is suitable for use in products such as fillers, rubber and rubber like polymers. Completely depigmented silica is suitable for use in products such as paper, powders, and fine chemicals.

Advantageously, the invention provides product silica suitable for clean, non-toxic landfill or for use as a feedstock for other commercial products including but not limited to fillers for paints, paper, rubber, drying agents, chromatographic materials, and other silica products including powders, catalyst supports, absorbents.

DEPOSIT

Figure 1:
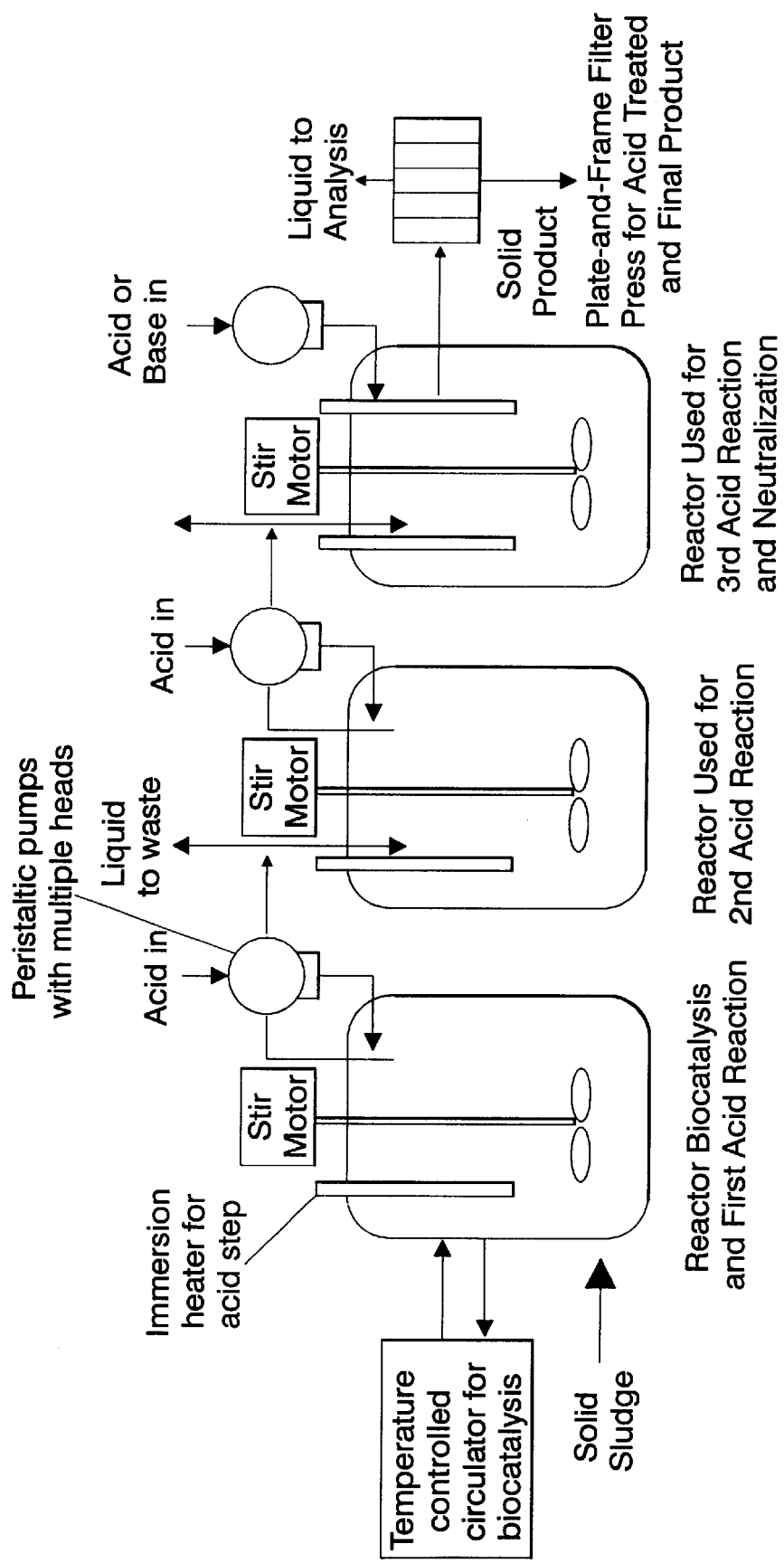
FIG. 1 is a flow chart of a process described in Example 1.

A number of microorganisms, grown and adapted for purposes of U.S. Pat. Nos. 5,366,891 and 4,780,238 were deposited in the American Type Culture Collection in accordance with the permanency and accessibility requirements of the U.S. Patent and Trademark Office. That information regarding microorganisms in U.S. Pat. Nos. 5,366,891 and 4,780,238 is herein incorporated by reference.

DETAILED DESCRIPTION OF THE INVENTION

The term geothermal residue as used herein is intended to include geothermal sludge and brine which are waste products from geothermal energy plants. These waste products contain dissolved solids including silica and metal compounds. On cooling of geothermal fluids, a solids-containing sludge is produced. The sludge generally comprises pigmented silica and also metals and metal salts. It has now been found that further treatment of the sludge can produce commercially useful products. It is believed that there has been, up to now, a lack of practical, commercial use for geothermal residues.

The pigmentation is generally due to different chemical species of iron. The species of iron pigments include those shown in Table 1:

TABLE 1

| Chemical Species of Iron | Pigmentation |
|---|---|
| Fe(OH) Hydrous Ferric Oxide | Brown |
| $Fe_3O_4$, a mixture of Fe(II)-Fe(III) Oxide | Black |
| Alpha $Fe_2O_3$ | Red Brown |
| Fe(III) Chloride-$6H_2O$ | Yellow |
| Fe(II) Chloride-$8H_2O$ | Colorless |
| Fe(II) Chloride-$6H_2O$ and Fe(II) Chloride-$H_2O$ | Pale Green |
| Iron (II) and Iron (III) Sulfides | Black |

It has been discovered that pigmented silica in geothermal residues can be converted into feedstock for commercially useful products by processing with various concentrations of certain depigmenting reagents. These depigmenting reagents include reducing agents which can change the oxidation state or speciation of metals, or complexing agents which can act by chelation. Reducing agents encompass acidic reagents including inorganic acids such as hydrochloric acid and nitric acid, and organic acids and complexing agents such as acetic, oxalic, gluconic, oxosuccinic, succinic, tartaric, beta-ketoglutaric, thiomalic, maleic and similar dicarboxylic acids. Complexing agents also include hydroxamates and piochelins.

Organic depigmenting reagents can also include compounds produced during normal metabolism of certain microorganisms described in U.S. Pat. No. 4,780,238, the entire disclosure of which is incorporated by reference herein. The patent describes metabolic products produced by the *Pseudomonas aeruginosa* family of organisms. These metabolic products are characterized as chelating agents that are useful to detoxify uranium, plutonium, thorium and other toxic metals. Several of the chelating agents possess isoquinoline, catechol, phenol, amino and/or hydroxamate reactive centers. In one embodiment, *P. Aeruginosa* PAO-1 (ATCC 15692) was grown in medium in the presence of thorium or uranium. Maximum growth cultures were centrifuged and filtered, the ultrafiltrate was fractionated and complexes were identified containing fluorescent groups, i.e., isoquinoline, phenol, and/or catechol, as well as amino and/or hydroxamate components. Further chromatography of an acidified ethanol extract of PAO-1 thorium culture yielded fractions consistent with pyrimine $C_{10}N_2O_3H_{12}$, pyochelin $C_{10}H_{16}N_2O_2S_2$ and analogues of pyochelin.

Before or after depigmentation, the geothermal residue can also be subjected to a metal solubilizing treatment, i.e., primary biochemical treatment to remove metals and metal salts. It is particularly advantageous to remove toxic metals. The metal solubilizing treatment step or primary biochemical treatment preferably uses the method described in U.S. Pat. No. 5,366,891 to Premuzic and Lin which is incorporated by reference herein in its entirety. In the method of U.S. Pat. No. 5,366,891, metal salts in geothermal brine or sludge are removed by contacting a geothermal brine or sludge containing metal salts with a mixture of microorganisms which can be called biocatalyst, containing at least one Thiobacillus which solubilizes metal salts at elevated temperatures from about 20° C. to about 90° C., preferably from about 30° C. to about 60° C. Preferably the solubilizing agent comprises a biocatalyst containing at least one Thiobacillus. After the solubilizing treatment, the liquid containing solubilized metal is separated from the solid residual sludge which consists primarily of silica. Separating can be performed by any known step such as filtering, centrifuging, or sedimenting.

The biocatalysts include members of the Thiobacillus family, *Thiobacillus ferrooxidans* ATCC numbers 53982, 53983, 53984, 53985, 53986, 53987 and *Thiobacillus thiooxidons* ATCC number 55019, 55020, 53990, 55009. The Thiobacilli may be used alone or in combination. In one embodiment, BC1 (*B. thiooxidans* ATCC 53990) and BC2 (*B.thiooxidans* ATCC 55019) are used in a 50:50 or 85:15 BC1:BC2 mix. In another embodiment, a single biocatalyst strain such as ATCC 53990 or ATCC 55019 is used alone. This biocatalyst treatment step produces treated sludge suitable for non-regulated disposal.

Figure 2:
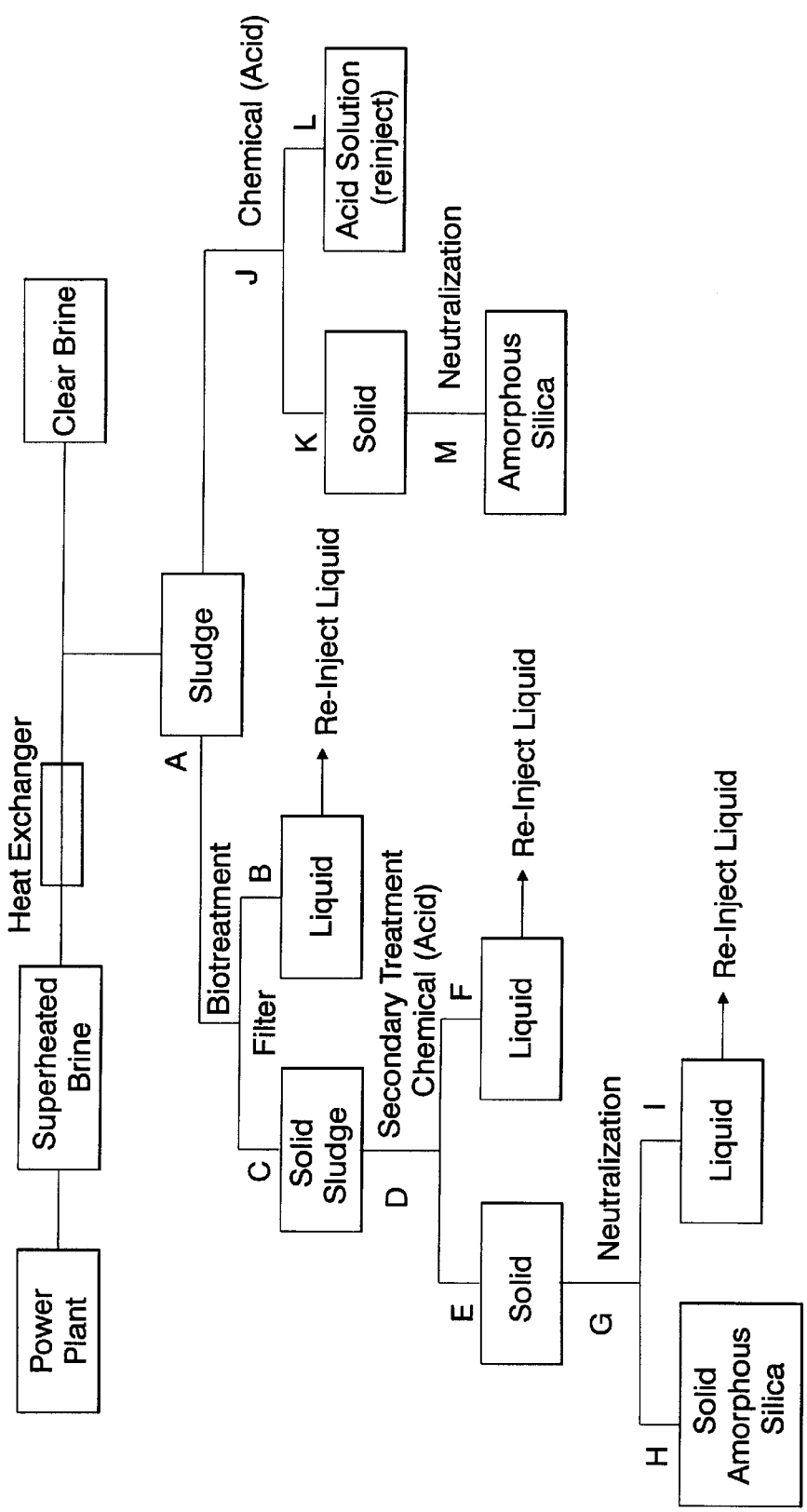
FIG. 2 is a flow chart of a process of the invention for biochemical processing of geothermal sludges and brine.

Total laboratory scale process is shown in FIG. 1. In this configuration, the processing can be a combination of biochemical and chemical steps, or chemical steps only, depending of the desired product. A typical overall process for a 50 MW plant is shown in FIG. 2 illustrating a general process in which primary treatment may be biochemical or chemical, i.e., using biocatalyst, then depigmenting contacting, or depigmenting contacting without biotreatment. The biocatalyst treatment is described in U.S. Pat. No. 5,366,891 wherein a biochemical process removes toxic metals so that a product amorphous silica meets regulatory requirements for disposal, allowing the residual silica to be disposed of as non-hazardous waste. If this silica is to be used for making useful products, additional secondary treatment is needed. Additional secondary treatment is chemical as shown in FIG. 2 and can use various concentrations of acid, e.g., hydrochloric acid, as shown in Table 2 below.

TABLE 2

Acid Treatment

| Treatment Agent HCl conc. Wt./vol. | start weight | corrected for moisture | weight after treatment | % soluble salts in the aqueous phase | comments |
|---|---|---|---|---|---|
| 37% | 10.05 g | 8.54 | 6.67 g | 22 | yellow |
| 18.5% | 10.08 g | 8.57 | 4.96 g | 42 | yellow |
| 9.3% | 10.10 g | 8.59 | 4.24 g | 51 | brown yellow |
| 4.7% | 10.00 g | 8.50 | 4.74 g | 44 | cream-yellow |
| 2.35% | 10.04 g | 8.53 | 4.57 g | 46 | off white |
| ½% | 9.98 g | 8.48 | 4.56 g | 46 | tan-white |
| 0.6% | 10.05 g | 8.54 | 4.35 g | 49 | brown white |

In addition, several strengths of acidic reagent can be used sequentially. The choice of process depends on the desired products. If high grade amorphous silica is the desired product, then tertiary treatment can also be used. This tertiary treatment includes the addition of acid to the alkaline solution of depigmented silica to reprecipitate amorphous silica. The base can be a normal sodium hydroxide or equivalent and can be neutralized in a conventional manner, e.g. titration.

The invention is illustrated by the following non-limiting examples.

EXAMPLE 1

Geothermal sludge was treated to produce silica as shown in FIG. 1. Two treatment routes may be followed:

I.) In one method, the geothermal sludge was treated according to U.S. Pat. No. 5,366,891 using *Thiobacillus thiooxidans* ATCC 53990 or *Thiobacillus thiooxidans* ATCC 55019 to solubilize heavy toxic metals, radionuclides and valuable metals producing wet sludge containing solid material mixed with a liquid containing solubilized heavy toxic metals, radionuclides and valuable metals. The wet treated sludge was subjected to a means for separating solid material from liquid. The means of separating can be, for example, a filter or settling. The separated solid material in stream C was metal-detoxified sludge and was non-regulated waste as a result of the Primary Biochemical Treatment. The composition of the separated solid material was mainly pigmented amorphous silica.

The metal detoxified sludge which was pigmented amorphous silica was subjected to a Secondary Treatment stage. In the Secondary Treatment, the pigmented amorphous silica was contacted with liquid acidic reagent HCl in an acid to silica ratio of 12:1 with a progressive decrease in acid concentration. In the neutralizing step, the pH is adjusted to between about 6–7. The process was carried out at approximately 90° C. for one hour at each step.

ii.) In an alternate method, the geothermal sludge from the power plant was also treated for silica production without Primary Biochemical Treatment. In this case, the sludge was subjected directly to acid treatment, and the solid neutralized to produce amorphous silica.

Figure 3A:
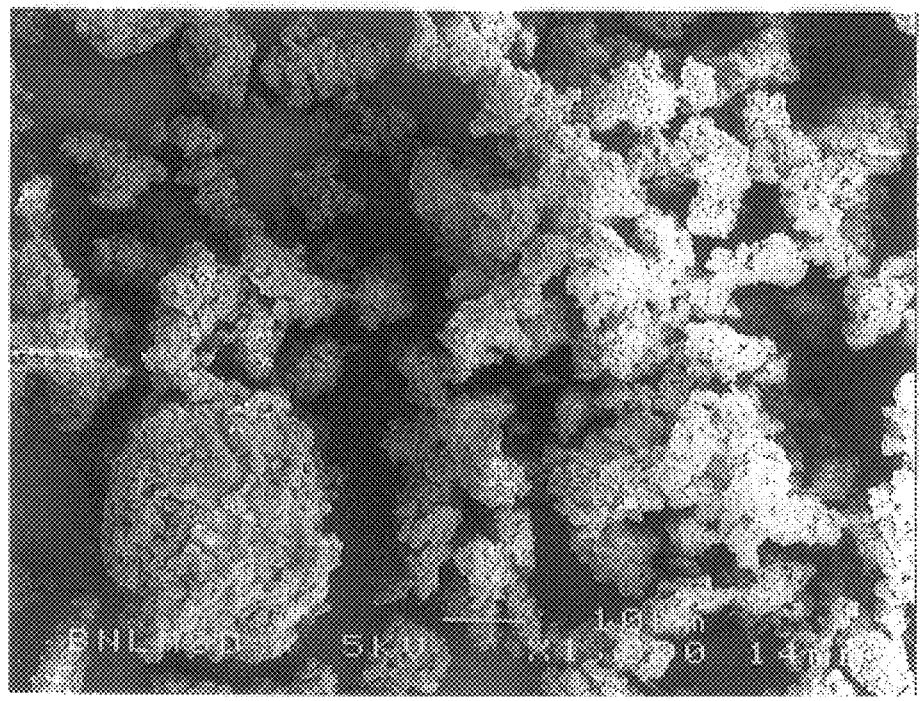
FIGS. 3a, 3b, 3c and 3d are photomicrographs comparing silica products of Example 1.
Figure 3B:
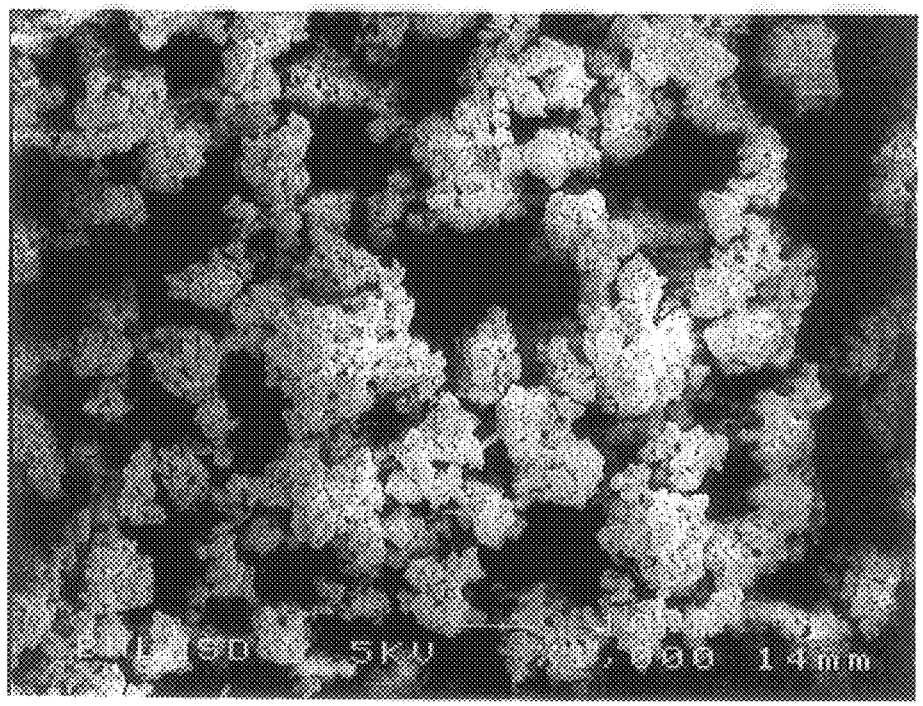
Figure 3C:
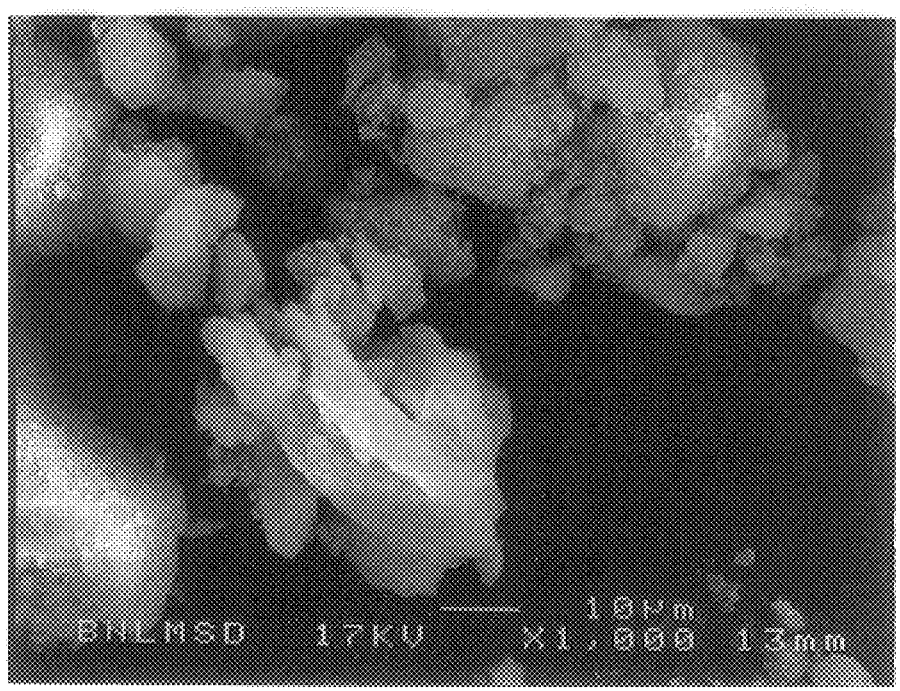
Figure 3D:
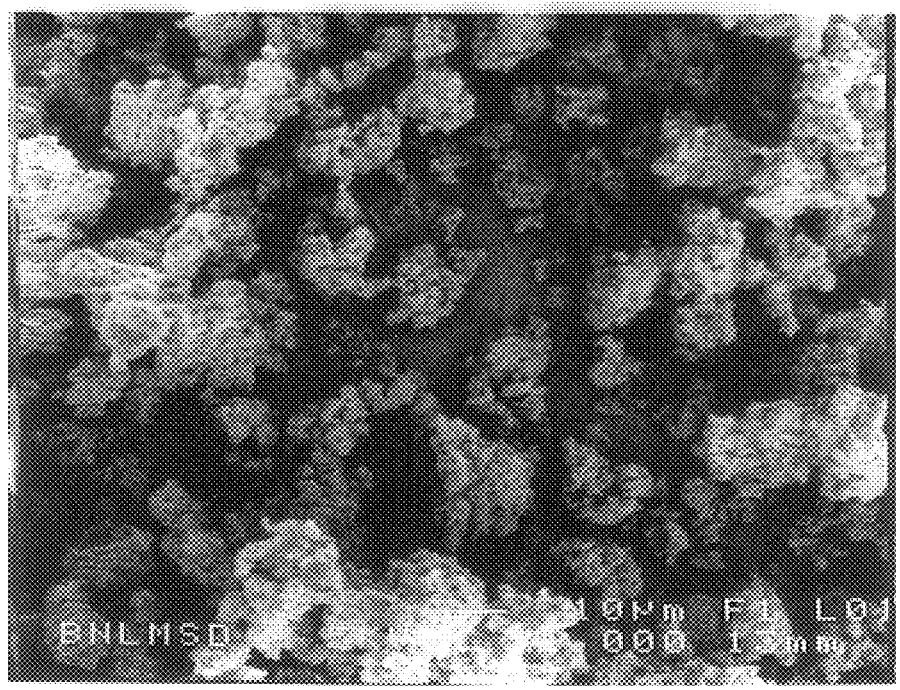

The silica products produced in the laboratory vial these two different routes I.) and ii.) differ in physical properties. SEM photomicrographs of the products from the two different routes are shown in FIG. 3. FIG. 3a shows silica from geothermal sludge before treatment. FIG. 3b shows metal detoxified sludge resulting from primary biochemical treatment. FIG. 3d shows the biotreated, metal detoxified sludge after acid depigmenting reagent contacting. FIG. 3c shows the silica from geothermal sludge after direct contacting with acid depigmenting reagent (HCl) without primary biochemical treatment. The product shown in FIG. 3c is more agglomerated than the product shown in FIG. 3b.

Silica from either route can be used commercially. The route using a biocatalyst generally produces a better quality silica. The silica from the biocatalyst route can be used, for example, in fine chemicals and paints. The silica produced by the acid only route can be used, for example, in various fillers and colored paints. Very often, the use of the silica produced and its quality will depend on the source. For example, low salinity sources of silica which are alkaline yield, on reprecipitation, high quality amorphous silica suitable in fine chemicals.

EXAMPLE 2

Geothermal sludges were subjected to treatment by two different biocatalysts ATCC 824 *Clostridium acetobutylicum* and ATCC 49001 *Clostridium collagenovorans* at 40° C. for two days. After treatment, the solid product was separated (e.g. by filtration) and dried at 200° C. for 24 hours. Surface characteristics of the products were determined using the principle of gas adsorption as applied by a Micromeritics TriStar 3000 Surface Area and Porosimetry Analyzer. A nitrogen adsorption isotherm for a sample was produced by adsorbing nitrogen gas of increasing partial pressure onto the surface of the sludges at liquid nitrogen temperature. The data from this isotherm was then processed using the BET method (Brunauer, S., Emmet, P. H., and Teller, E., J Am. Chem Soc. 60, 309 (1938) to calculate the surface area and the BHJ method (Barrett, E. P., Joyner, L. G., and Halnda, P. P., J Am. Chem. Soc. 73, 373 (1951) to calculate the distribution of pore volume and pore area versus pore diameter.

Figure 4:
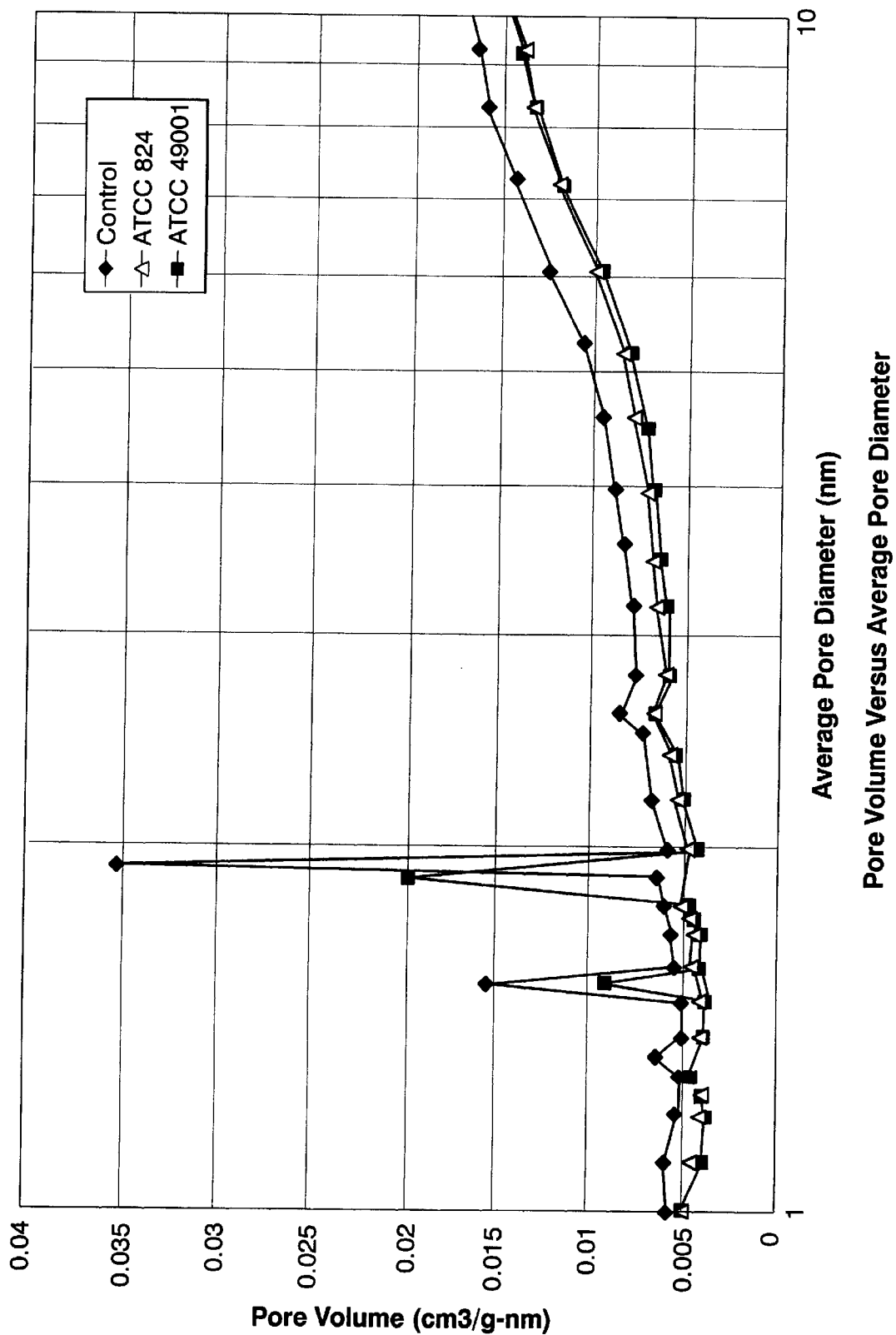
FIG. 4 is a graph showing pore volume vs. pore diameter in the silica produced by a process of the invention.
Figure 5:
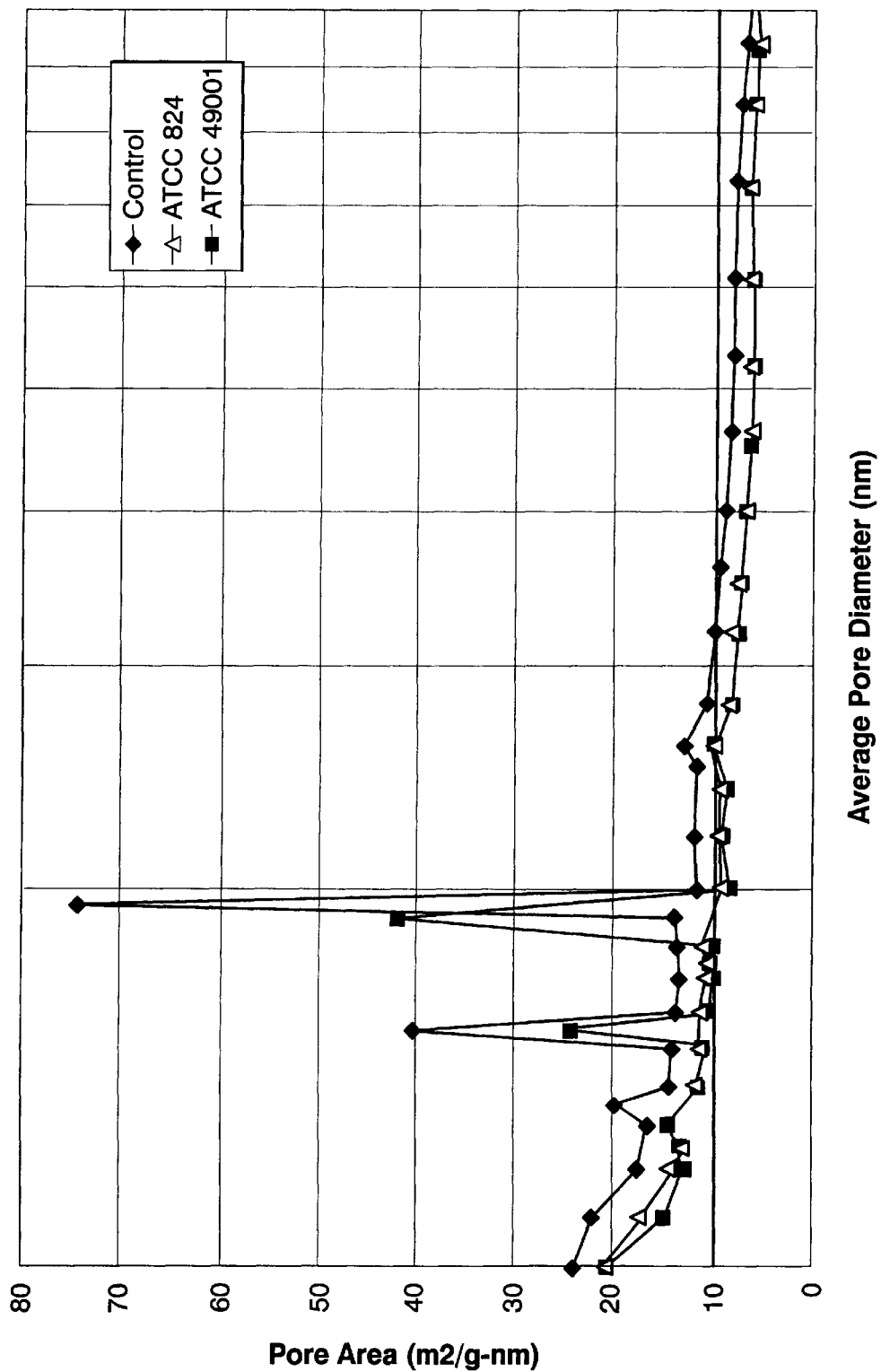
FIG. 5 is a graph showing pore area vs. pore diameter in the silica produced by a process of the invention.

Graphic presentation of the results is given in FIGS. 4 and 5 showing representative plots of Pore Volume versus Pore Diameter in FIG. 4 and Pore Area versus Pore Diameter in FIG. 5. Numeric data are presented in Table 3 below.

TABLE 3

| Sample ID | Data File | Surface Area BET $(m^2/g)$ | Cumulative Pore Volume $(cm^3/g)$ | Cumulative Pore Area $(m^2/g)$ |
|---|---|---|---|---|
| Control: Media + Sludge | 128 | 10.00 | 0.0448 | 14.25 |
| ATCC 824 | 129 | 10.40 | 0.0451 | 14.89 |
| ATCC49001 | 133 | 12.31 | 0.0486 | 17.26 |

It can be seen from the numeric data that treatment of geothermal sludge with bacterial cultures acts to increase BET surface area, cumulative pore volume and cumulative pore area. While these data serve to provide a general picture of the result of biotreatment, FIGS. 4 and 5 illustrate the effects more specifically. The pore distributions of the control sample show pore volume and pore area maxima in pores with diameters of 1.7 and 1.9 nanometers. The pore distributions of the biotreated samples show that these peaks of volume and area are clearly enhanced.

EXAMPLE 3

Figure 6:
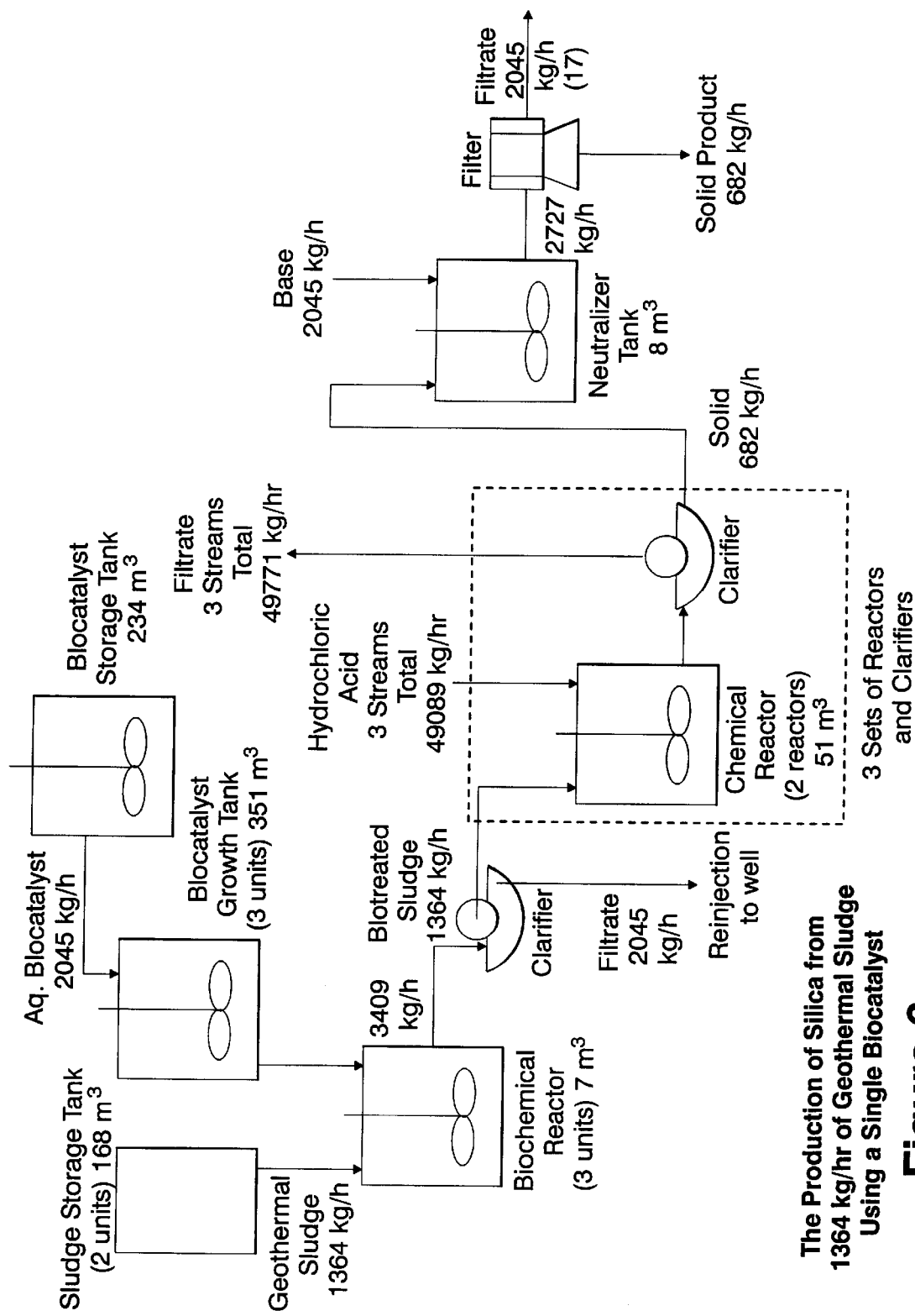
FIG. 6 is a flow chart for an industrial plant based upon the process of the invention as described in Example 3.

FIG. 6 is a flow sheet for an industrial plant based upon the process of the invention. The design represents a scaled up plant based upon laboratory experiments. In the flow sheet FIG. 6, silica is produced from 1364 kg/hr of geothermal sludge. Biocatalyst is grown in separate growth tanks and then mixed with geothermal sludge in biochemical reactors. The process can be efficiently carried out using several duplicative reactor units for each step. In the biochemical reactor, metal salts are solubilized from the sludge and thus removed leaving solid pigmented siliceous material. Following biochemical reaction, the biotreated sludge is filtered in a clarifier (filter) apparatus. The liquid filtrate containing solubilized metals could be reinjected to the well. The solid material now containing pigmented silica is conveyed to a chemical reactor where the material is treated with hydrochloric acid for depigmentation. The chemically treated depigmented material was conveyed to another clarifier apparatus where solid depigmented silica was filtered out leaving acidic liquid containing dissolved impurities and pigment compounds which were mainly iron compounds. The dissolved impurities (toxic heavy metals, radionuclides, pigments) are reinjected. The solid depigmented silica was fed into a neutralizer tank where it was contacted with base such as sodium hydroxide. The neutralized silica is then filtered out of the basic liquid yielding high quality amorphous silica.

EXAMPLE 4

Figure 7:
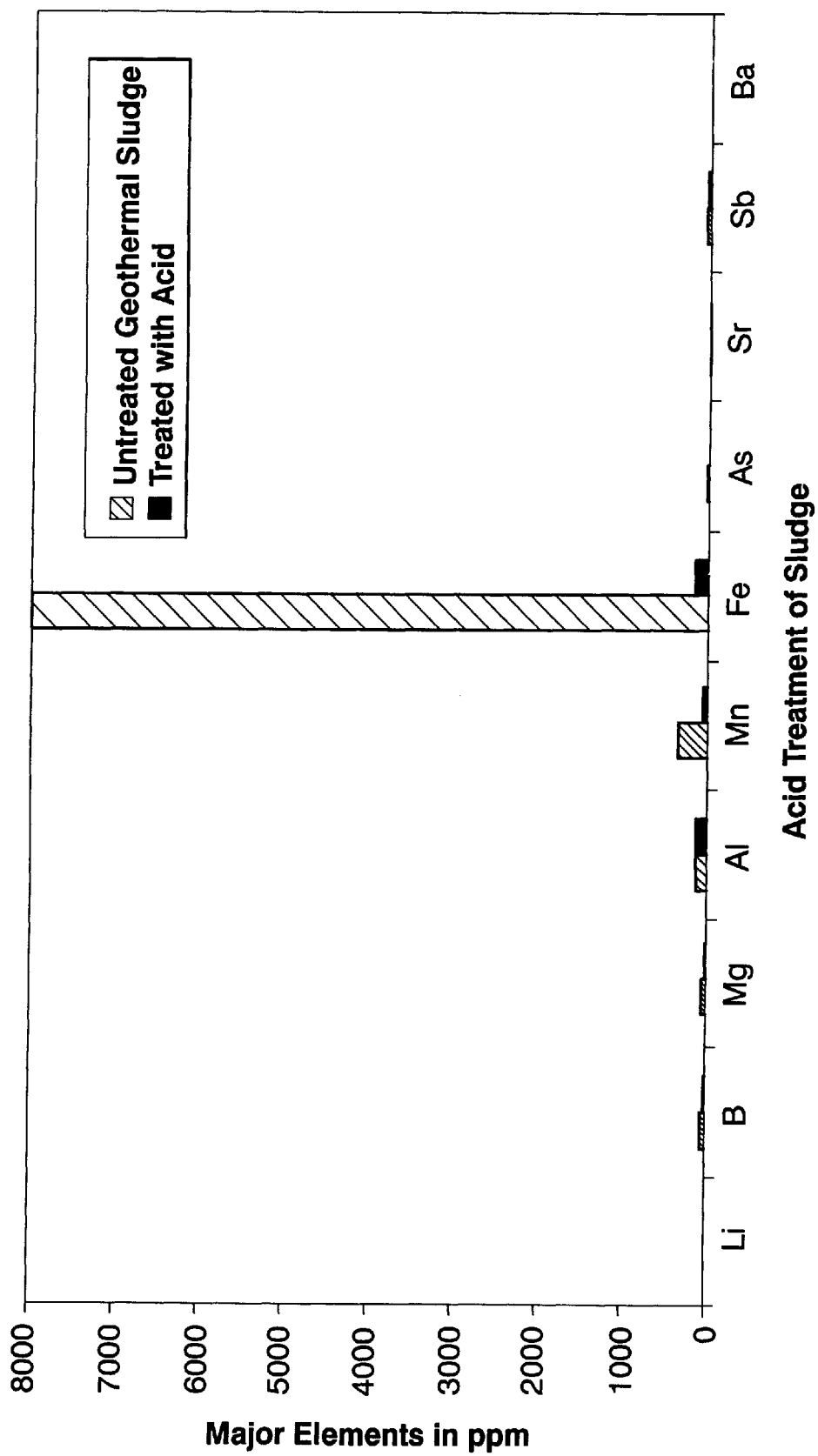
FIG. 7 is a graph showing results of acid treatment of geothermal sludge.
Figure 8:
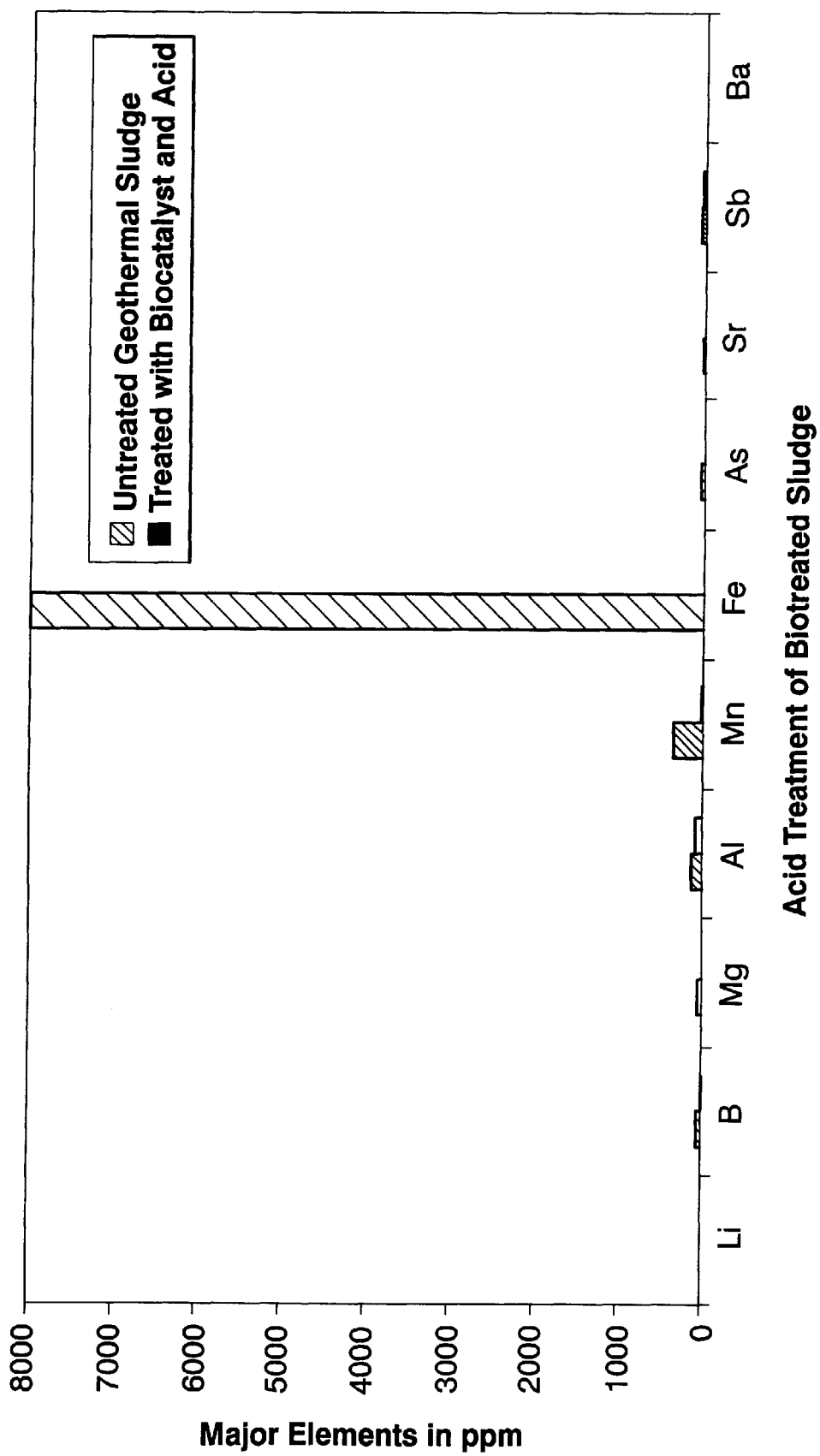
FIG. 8 is a graph showing results of acid treatment of biotreated geothermal sludge.

Depigmentation expressed in terms of total metal concentrations was determined using the bio-acid treated and acid treated streams produced in Example 1, which is the source of data shown in FIGS. 7 and 8. FIG. 8 shows that acid treatment of biotreated sludge shows better removal of metals than acid treatment alone (FIG. 7), particularly of iron, considered the major contributor to pigmentation. These results imply that biotreatment makes silica structurally more amenable to efficient chemical processing. While it is not intended to be bound by theory, this may be due to the action of biochemical agent at metal sites within the silica structure.

EXAMPLE 5

Silica samples produced in a manner described in Example 1 were analyzed and compared with commercial silica (Imsil 1160 Silica, Unimin Specialty Minerals, Inc.). Each of the three samples was incorporated into a vinyl acrylic latex wall paint, substituting the silicas for one another at equal weight. The preparations were then evaluated using ASTM Test Methods. The results are shown in Table 4 below.

TABLE 4

Summary Table: Interior Vinyl Acrylic Flat White Wall Paint

|  | Imsil 1160 | BNL Sample 1 | BNL Sample 2 |
| --- | --- | --- | --- |
| Ease of Dispersion | 5 | 5 | 5 |
| Fineness of Grind | 5 | 3 | 5 |
| Viscosity Stability | 5 | 5 | 5 |
| H Stability | 5 | 5 | 5 |
| Package Stability | 5 | 5 | 5 |
| Freeze- Thaw | 5 | 5 | 5 |
| Reflectance | 5 | 3 | 5 |
| Contrast Ratio | 3 | 5 | 5 |
| Pencil Hardness | 5 | 5 | 5 |
| Sheen - 85° | 5 | 5 | 5 |
| Burnishing | 5 | 5 | 5 |
| Scrubbability | 7 | 5 | 3 |
| Application Properties | 5 | 5 | 5 |
| TOTAL RATING | 65 | 61 | 63 |

The results show that the silica produced accordingly to the invention had only minor differences from commercial silica.

EXAMPLE 6

Figure 9:
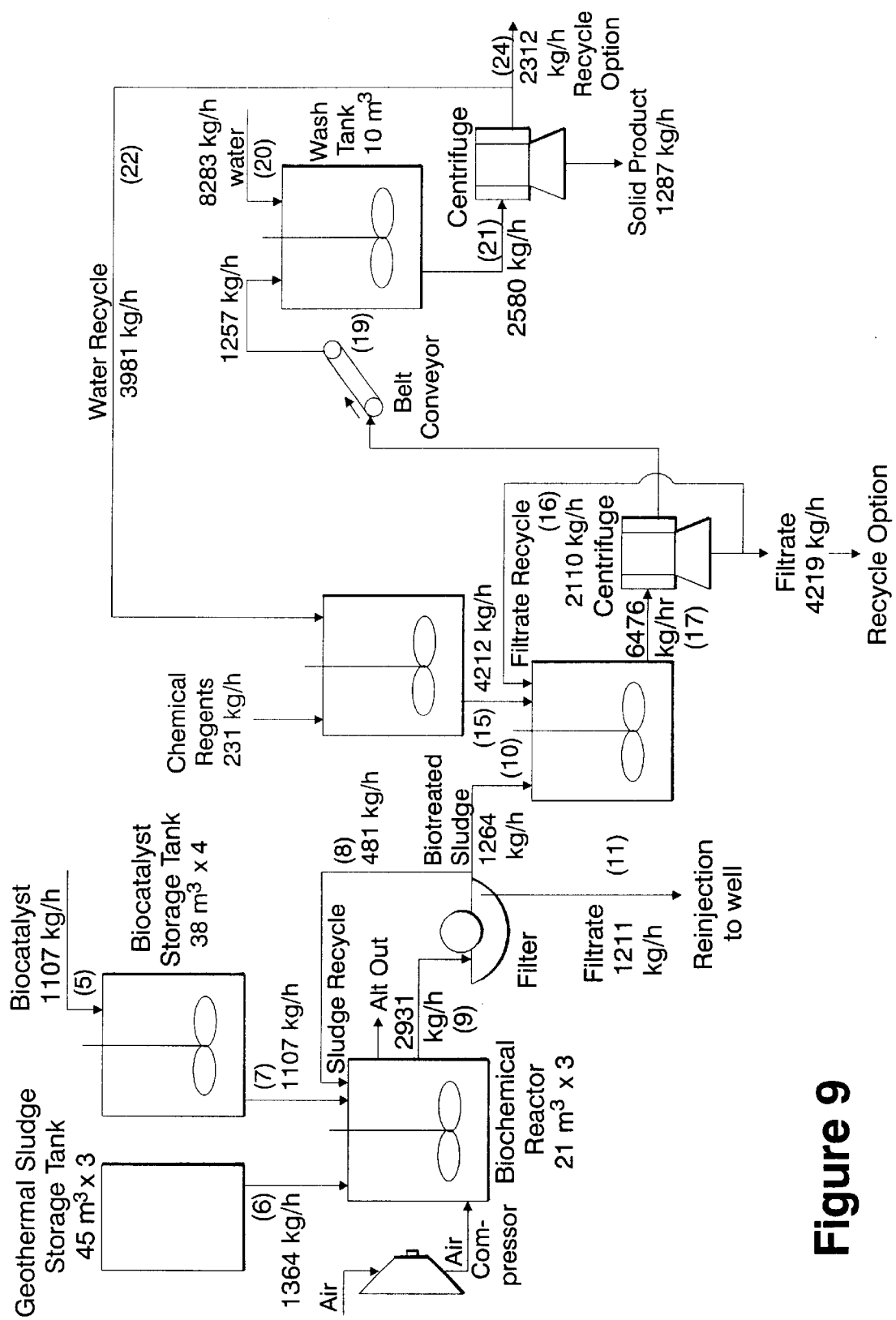
FIG. 9 is a flowchart of an industrial plant based upon the process of the invention as described in Example 6.

Another industrial plant flow sheet based upon laboratory experiments is shown in FIG. 9. In the flow sheet of FIG. 9, wet geothermal sludge is collected in a storage tank. The geothermal sludge is then conveyed through stream 6 to a Biochemical Reactor. Biocatalyst is conveyed through stream 7 to the Biochemical Reactor. The wet sludge and biocatalyst are agitated together, aerated and allowed to react so that the biocatalyst solubilizes heavy toxic metals, radionuclides and other metals contained in metal salt form in the wet geothermal sludge. The contents of the Biochemical Reactor are then conveyed through line 9 to a filter which separates biotreated sludge solid material from liquid containing solubilized metals and radionuclides. The liquid is conveyed through line 11 to be reinjected into a well. The separated biotreated sludge can be recycled through line 8 to be retreated in the Biochemical Reactor, or the biotreated sludge can be conveyed through line 10 to a reactor where depigmenting liquid acids reagents stored in a reagent storage tank can be conveyed through line 15 to the Reactor where the reagents are mixed with the biotreated sludge in a sludge:reagent ratio of 1 kg:5 L to depigment the sludge. The mixed contents of the Reactor are conveyed through line 17 to a centrifuge to separate depigmented solid product as filtrate separated from the reagent liquid. The solid product which is depigmented silica is conveyed out of the centrifuge onto a conveyor 19 into a wash tank for washing with water. The contents of the wash tank are transported through line 21 to a centrifuge which separates solid depigmented, washed silica product and water. The water can be recycled through stream 22 to be used for reagent dilution in the reagent storage tank. The depigmented, washed silica product is suitable for commercial use as a filler or additive.

EXAMPLE 7

Figure 10:
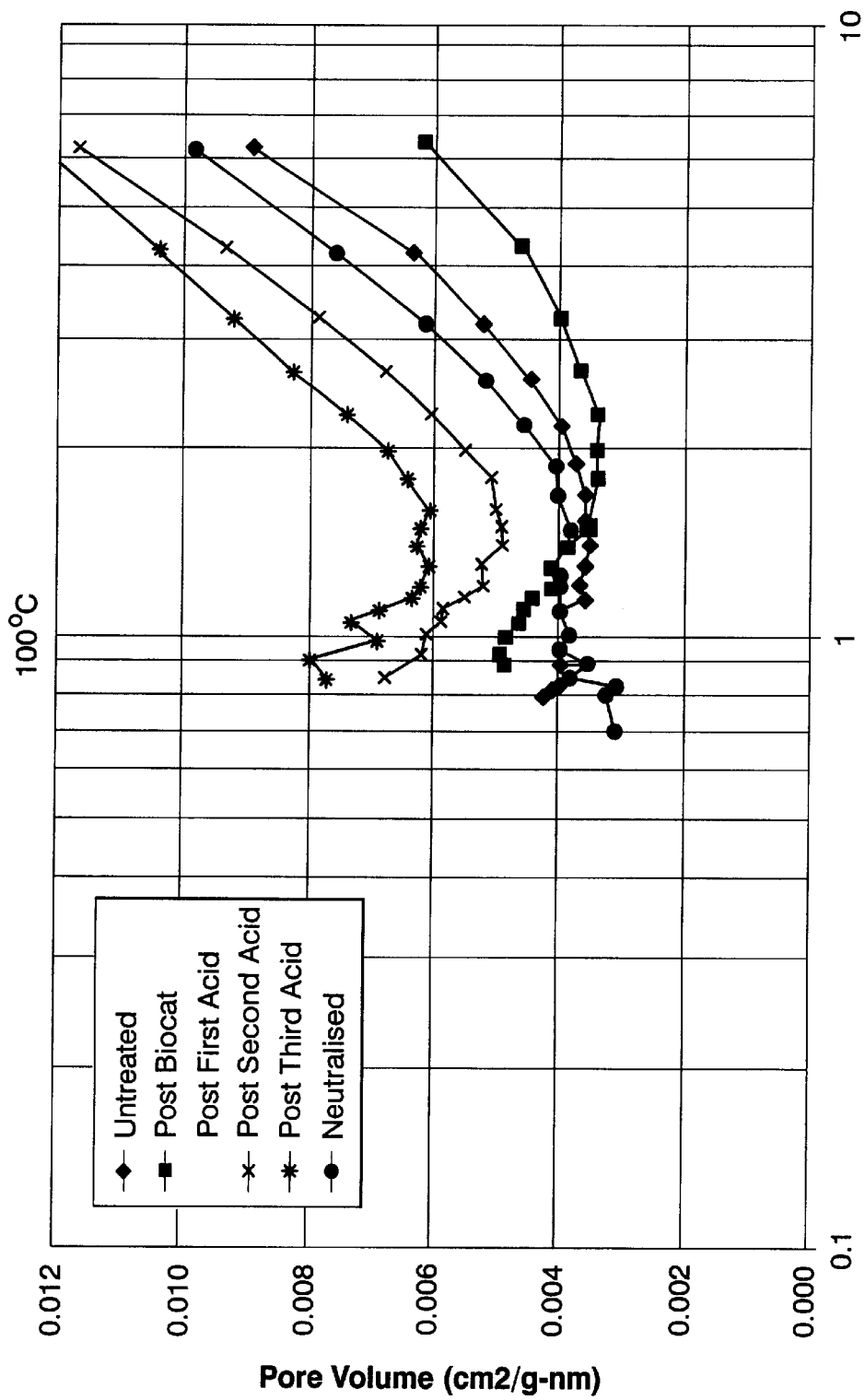
FIG. 10 is a graph showing the effect of drying temperature on pore size of various biocatalyst and acid treatment end products.
Figure 11:
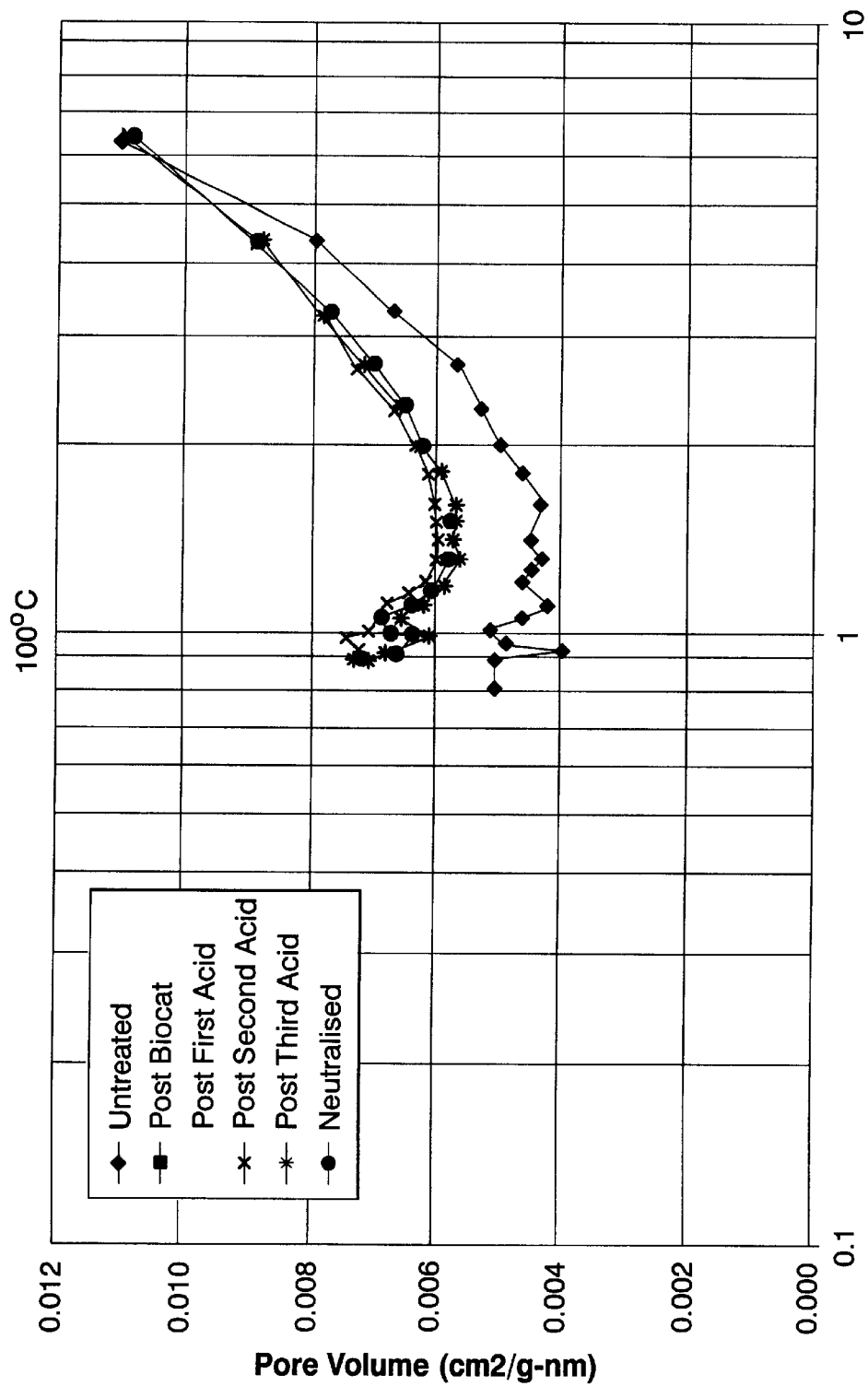
FIG. 11 is a graph showing the effect of drying temperature on pore size of various acid treated only end products.

The effects of drying temperature on pore diameter of various end products was investigated. Untreated, bio-and-acid-treated (Post Biocat Post First Acid), bio-and-twice-acid-treated (Post Second Acid), bio-and-thrice-acid- treated (Post Third Acid), and bio-and-acid-treated-and-neutralized (Neutralized) geothermal silica samples were dried at 100° C. for 24 hours. Pore diameter in the dried samples was determined (as described in Example 2). Results are shown in FIGS. 10 and 11 and are discussed below in Example 8.

EXAMPLE 8

Figure 12:
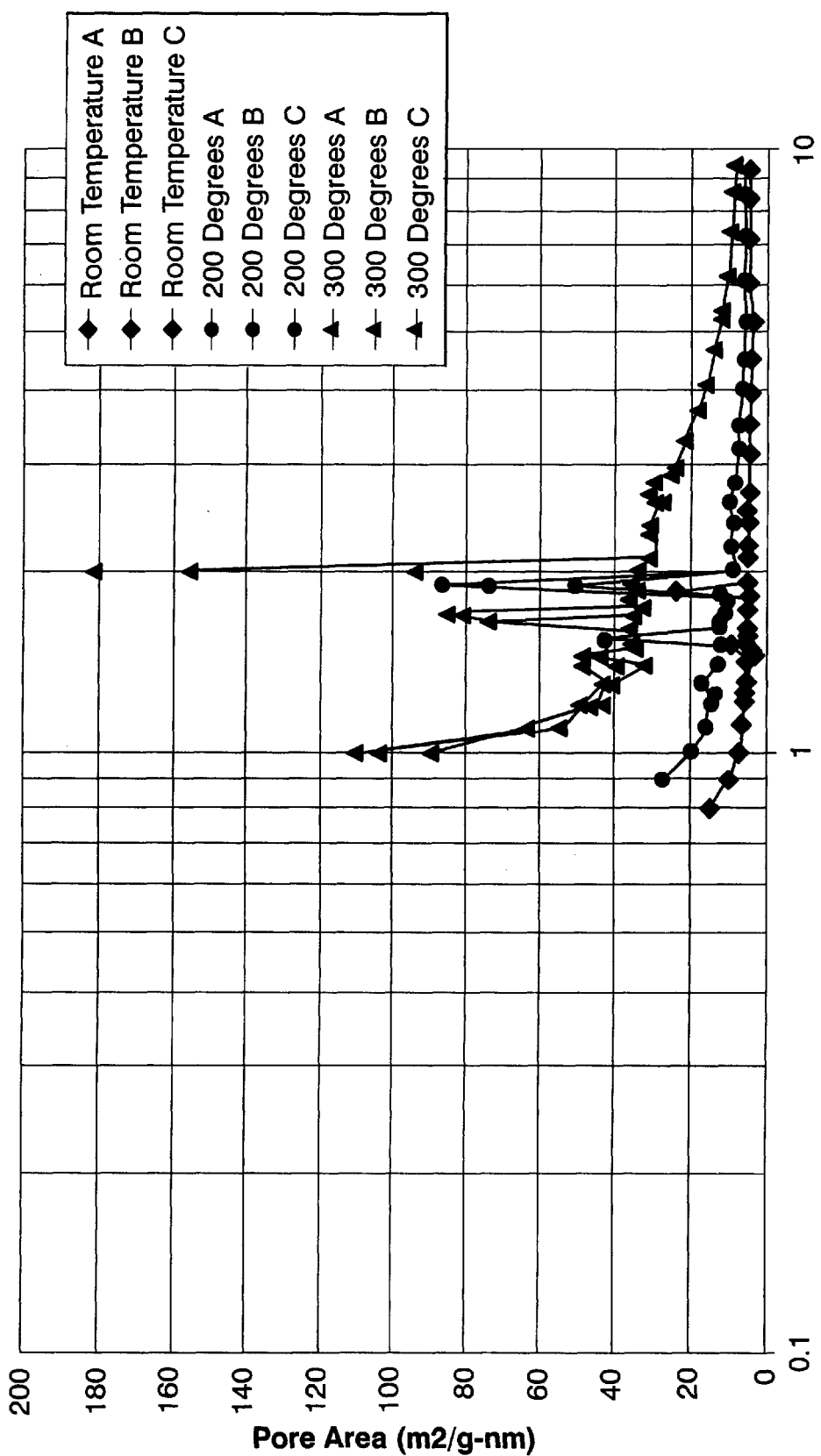
FIG. 12 is a graph showing the effect of drying temperature on pore area vs. pore diameter in silica produced by the invention.
Figure 13:
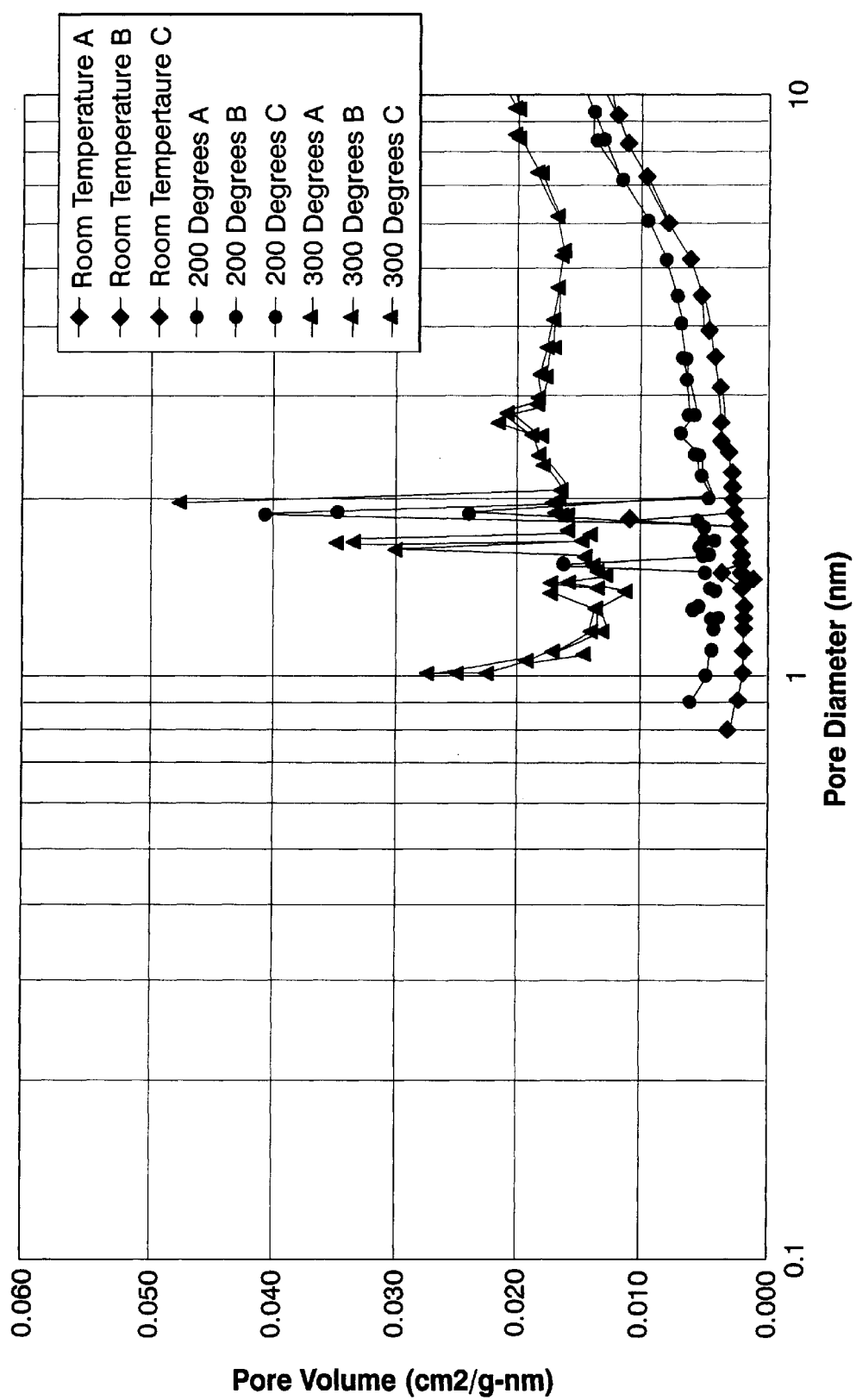
FIG. 13 is a graph showing temperature effect on pore volume vs. pore diameter in silica produced by the invention.

The effects of drying temperatures on triplicate samples (A, B, and C) at room temperature (25° C.), 200° C. and 300° C. were compared. The samples were obtained using the process of the invention including biocatalyst treatment as described in Example 1. Results are shown in FIGS. 12 and 13, and are discussed below.

Silica-containing superheated fluid from a geothermal reservoir is generally retrieved for electrical energy generation at high temperatures and pressures which depend on the geological source. As the superheated fluid enters into the heat extraction process, it starts cooling which results in the formation of a precipitate known as silica sludge.

The results show that chemical and physical properties (relative concentrations of toxic and valuable metals and salts involved in pigmentation, pore volume, surface area) can be controlled by different processing conditions. These include biotreatment, depigmentation by acid treatment at pH less than 1, and varying concentrations of acid (Table 2), temperature, and product neutralization.

In Table 2, the results show that the yield of high quality silica was about one half of the quantity of the original sludge feedstock.

Comparing FIGS. 10 and 11 from Example 7, the difference in the bio-acid-neutralization treatment (dried at 100° C.) and the acid-neutralization treatments is evident in both pore volume and pore diameter. In the biocatalyst and acid treatment, the biotreatment shifts the pore diameter to a large size with a concurrent increase in pore volume effect at 7 nm to 2 nm. In the acid treated only product, after the first acid treatment, there is no progressive pore volume increase. On neutralization, the bio-acid-neutralization product has a larger pore diameter than the acid-neutralization product treated at the same pore diameter range.

FIGS. 12 and 13 show silica products dried at 25° C. (room temperature), 200° C. and 300° C. The peaks show a shift to larger pore diameter as a function of temperature.

EXAMPLE 9

A determination was made of the usefulness of the silica product for chromatographic application in Thin Layer Chomatography. Silica samples were ground into fine powder with particle size distributions of 3% over 10 micrometers, 5% of 5–10 micrometers, 27% of 2–5 micrometers and 65% of less than 2 micrometers. Thin Layer Chromatography (TLC) plates were prepared containing the following:

15 g silica+1.5 g CaSO$_4$.1/2H$_2$O+13 ml H$_2$O

The TLC plates were made to about 0.2 mm in thickness and dried in a 60° C. oven for two hours before use.

For ease in visualizing the chromatographic separation, four dyestuff standards were used for testing the TLC plates. The dyes were dissolved in toluene to make stock solutions of the following concentrations:

(1) Methyl Red 3.9 mg/ml
(2) Neutral Red 4.5 mg/ml
(3) Bromthymol Blue (Becto) 3.3 mg/ml
(4) 2,6 Dichlorophenol-Indophenol 3 mg/ml.

One microliter each, about 3–4.5 gram, was spotted on each plate. Thin layer plates were developed in a solvent mixture of Hexane:Ether:Glacial Acetic Acid.

For comparison purposes, some standards were tested on commercially available plates (Whatman Al Sil G/UV, 250 micrometer layer), and the results are shown in Table 5. Similarly, plates were made using geothermal silica prepared according to the invention with results shown in Table 6. A comparison of the results in Tables 5 and 6 shows that the results using commercially available plates are reproducible, if not better, using plates made with geothermal silica. With performance defined in terms of separation, i.e., different Rf values, the geosilica product is of high quality when compared to commercial product.

$$Rf = \text{Distance of Sample/Distance of Solvent Front} \quad (I)$$

See, E. Stahl, Thin Layer Chromatography, Springer-Verlag, N.Y., pp. 1041 (1969).

TABLE 5

The Rf values obtained from commercial TLC plates

| Solvent v/v/v | Plate No. | Standard 1 Rf | Standard 2 Rf | Standard 3 Rf | Standard 4 Rf |
|---|---|---|---|---|---|
| 8/4/2 | 1 | 0.05 | 0.01 | 0.11 | 0.35 |
| 8/3/3 | 2 | 0.11 | 0.01 | 0.19 | 0.56 |
| 8/4/1 | 3 | 0.06 | 0.01 | 0.08 | 0.35 |
| 16/7/5 | 4 | 0.05 | 0.01 | 0.08 | 0.44 |
| 16/7/8 | 5 | 0.08 | 0.01 | 0.1 | 0.53 |

TABLE 6

The Rf values obtained from TLC plates made from geothermal silica

| Solvent v/v/v | Plate No. | Standard 1 Rf | Standard 2 Rf | Standard 3 Rf | Standard 4 Rf |
|---|---|---|---|---|---|
| 16/7/8 | 1 | 0.19 | 0.01 | 0.74 | 0.92 |
| 16/7/8 | 2 | 0.20 | 0.01 | 0.76 | 0.94 |

Comparison of Rf values of plate 1 in Table 5 (commercial silica) and plate 1 in Table 6 (geothermal silica) indicates that the geothermal silica plates had better separation of standards 1, 2, 3 and 4.

We claim:

1. A process for the treatment of geothermal residue comprising:
    A. contacting the geothermal residue with a metal salts solubilizing agent producing a mixture comprising:
        i. metal detoxified pigmented silica-containing components; and,
        ii. solubilized metal-containing components; and,
    B. separating the metal detoxified pigmented silica-containing components of i. from the solubilized metal-containing components of ii.; and
    C. contacting the metal detoxified, pigmented silica-containing components with a depigmenting reagent under depigmenting conditions producing a mixture comprising depigmented, detoxified silica and depigmenting reagent containing pigment; and
    D. separating the depigmented detoxified silica from the depigmenting reagent containing pigment; and
    E. manipulating the morphology of the depigmented silica by at least one of
        i. contacting the detoxified silica-containing component with the depigmenting reagent at least twice using decreasing concentrations of depigmenting reagent;
        ii. contacting the depigmented, detoxified silica with a neutralizing solution comprising a base;
        iii. drying the depigmented, detoxified silica at a temperature from about 25° C. to about 300° C.;
    to yield "metal-detoxified, depigmented silica."

2. The process of claim 1 wherein the separating comprises filtering, centrifuging or sedimenting.

3. The process of claim 1 wherein the metal solubilizing agent comprises a biocatalyst comprising a medium containing at least one Thiobacillus which solubilizes metal salts at temperatures from about 20° C. to about 90° C.

4. The process of claim 3 wherein the Thiobacillus is selected from the group consisting of *Thiobacillus ferrooxidans* ATCC#53982, ATCC#53983, ACCT#53984, ACCT#53985, ACCT#53986, ACCT#53987 and *Thiobacillus thiooxidans* ATCC#55020.

5. The process of claim 3 wherein the Thiobacillus produces a chelating agent.

6. The process of claim 1 wherein the metal salts contain a metal selected from the group consisting of Fe, Mn, W, B, Mg, Al, Cr, Zn, As, Se, Sr, Sb, Te or Ba, or a combination thereof.

7. The process of claim 1 wherein the pigment component comprises an iron compound.

8. The process of claim 7 wherein the iron compound is selected from the group consisting of Fe(OH), Fe$_3$O$_4$, alpha-Fe$_2$O$_3$, Fe(III)chloride-6H$_2$O, Fe(II)chloride-8H$_2$O, Fe(II)chloride-6H$_2$O, Fe(II)chloride-H$_2$O, Iron(II)sulfide and Iron(III)sulfide, or a combination thereof.

9. The process of claim 1 wherein the depigmenting reagent is selected from the group consisting of reducing agents and metal complexing agents.

10. The process of claim 1 wherein the depigmenting reagent comprises an organic dicarboxylic acid.

11. The process of claim 1 wherein the depigmenting agent comprises hydrochloric acid.

12. The process of claim 1 wherein the depigmented silica product comprises amorphous silica suitable for paint filler, paper filler, rubber filler, polymer filler, catalyst support material or chromatographic material.

13. A process for the treatment of geothermal residue comprising:
    at least once contacting the geothermal residue with a depigmenting reagent under depigmenting conditions to produce a mixture comprising a) depigmented silica-containing components and b) depigmenting reagent containing pigment components; and separating a) depigmented silica-containing components from b) depigmenting reagent containing a pigment components;

manipulating the morphology of the depigmented silica by at least one of
  i. contacting the depigmented silica-containing components with the depigmenting reagent at least twice using decreasing concentrations of depigmenting reagent;
  ii. contacting the depigmented silica-containing components with a neutralizing solution comprising a base;
  iii. drying the depigmented silica-containing components at a temperature from about 25° C. to about 300° C.;

to yield depigmented silica substantially devoid of pigment.

* * * * *